(12) United States Patent
Ortiz

(10) Patent No.: US 11,274,796 B2
(45) Date of Patent: Mar. 15, 2022

(54) DYNAMIC GAS OPTIMIZATION SYSTEM

(71) Applicant: Landmark Graphics Corporation, Houston, TX (US)

(72) Inventor: Thomas Manuel Ortiz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 966 days.

(21) Appl. No.: 15/761,773

(22) PCT Filed: Oct. 6, 2015

(86) PCT No.: PCT/US2015/054308
§ 371 (c)(1),
(2) Date: Mar. 20, 2018

(87) PCT Pub. No.: WO2017/061994
PCT Pub. Date: Apr. 13, 2017

(65) Prior Publication Data
US 2020/0240590 A1    Jul. 30, 2020

(51) Int. Cl.
| | | |
|---|---|---|
| *F17D 3/01* | (2006.01) | |
| *F17D 1/04* | (2006.01) | |
| *F17D 3/18* | (2006.01) | |
| *F17D 5/06* | (2006.01) | |
| *G01D 4/00* | (2006.01) | |

(52) U.S. Cl.
CPC ............... *F17D 3/01* (2013.01); *F17D 1/04* (2013.01); *F17D 3/18* (2013.01); *F17D 5/06* (2013.01); *G01D 4/002* (2013.01)

(58) Field of Classification Search
CPC ...................................................... G06Q 50/06
See application file for complete search history.

(56) References Cited

U.S. PATENT DOCUMENTS

| | | |
|---|---|---|
| 4,809,154 A | 2/1989 | Newton |
| 6,237,618 B1 | 5/2001 | Kushner |
| (Continued) | | |

OTHER PUBLICATIONS

Amoretti et al. (Non-patent literature tilted "Towards a peer-to-peer hydrogen economy framework" International Journal of Hydrogen Energy, 36, 6376, 6386 (Year: 2011).*

(Continued)

*Primary Examiner* — Emmett K. Walsh
(74) *Attorney, Agent, or Firm* — Haynes and Boone, LLP

(57) ABSTRACT

A system for optimally controlling gas flows in a pipeline network having gas import points, gas export points, and pipelines connected therebetween. The pipelines are interconnected by at least one junction. Each gas import point, gas export point and junction has a sensor and a flow control device, both of which correspond to a unique smart meter. Each smart meter includes a communication network interface and a flow control device controller. Each smart meter is capable of repeatedly: (1) receiving system gas data and first local gas request parameters from at least one other smart meter; (2) controlling the flow control device via the flow control device controller; (3) generating local gas values based on an output from the corresponding sensor; (4) calculating second local gas request parameters based on the local gas values and the system gas data; and (5) transmitting the system gas data.

8 Claims, 5 Drawing Sheets

(56) References Cited

U.S. PATENT DOCUMENTS

| | | | |
|---|---|---|---|
| 7,316,151 | B2 | 1/2008 | Sivaraman |
| 7,763,474 | B2 | 7/2010 | Hassell |
| 9,086,373 | B2 | 7/2015 | Little, III et al. |
| 9,564,945 | B1 * | 2/2017 | Goyal .................... H04L 43/50 |
| 2006/0278281 | A1 | 12/2006 | Gynz-Rekowski et al. |
| 2009/0313896 | A1 | 12/2009 | Glidewell |
| 2014/0130878 | A1 | 5/2014 | Marinez |
| 2014/0305517 | A1 | 10/2014 | Adler et al. |
| 2018/0128666 | A1 * | 5/2018 | Hishinuma .......... G01N 29/024 |

OTHER PUBLICATIONS

Tewolde et al., "High-Resolution Meter Reading Technique for Appliance Gas Usage Monitoring for the Smart Grid", 2011 8th International Conference & Expo on Emerging Technologies for a Smarter World (Year: 2011).*

Korean Intellectual Property Office, International Search Report and Written Opinion, PCT/US2015/054308, dated Jun. 17, 2016, 10 pages, Korea.

A. Sivaraman, G. Hazelden, J. McCarty, and A. Hammerschmidt, Development and Deployment of an Acoustic Resonance Technology for Energy Content Measurement, 2006, 9 pages $23^{rd}$ World Gas Conference, Amsterdam.

David Wood and Saeid Mokhatab, Natural Gas Interchangeability in Focus as Sources of LNG Widen, Feb. 2007, 5 pages, LNG Journal.

Vidi Saptari, Break-Through Optical Sensor for Natural Gas Composition Analysis, AN 73001-A, 2010, 6 pages, Precisive, LLC, Woburn, Massachusetts.

Government of Pakistan Ministry of Petroleum & Natural Resources, Low BTU Gas Pricing Policy, Apr. 2012, 9 pages.

FMC Technologies, In-Situ Verification, 2015, 1 page, http://www.fmctechnologies.com/en/Multiphase-meters/Services/In-Situ-Veritication.aspx.

Forest, David, Natural gas Producers Focus Shifting to Wet Gas, 1 page, http://oilprice.com/Eneray/Natural-Gas/Natural-Gas-Producers-Focus-Shifting-To-Wet-Gas.html.

Office Action issued for Canadian Patent Application No. 2,997,617, dated Aug. 28, 2019, 4 pages.

* cited by examiner

DYNAMIC GAS OPTIMIZATION SYSTEM

CROSS-REFERENCE TO RELATED APPLICATIONS

This application is a U.S. national stage patent application of International Patent Application No. PCT/US2015/054308, filed on Oct. 6, 2015, the benefit of which is claimed and the disclosure of which is incorporated herein by reference in its entirety.

BACKGROUND

Oil and gas fields produce natural gas streams having different compositions of hydrocarbons such as methane, ethane, propane, butane, pentane, hexane, heptane and octane as well as "impurities" such as water, carbon dioxide, nitrogen, oxygen, helium and sulfur compounds. These streams can be initially processed to remove impurities and hydrocarbons that are natural gas liquids ("NGLs") or condensates such as butane, ethane, propane and pentane, hexane, heptane and octane.

Generally, natural gas is classified as "dry" or "wet." Dry natural gas is almost completely methane. The higher the methane concentration within the gas, the drier it is. Wet natural gas contains less than 85% methane and has a higher percentage of NGLs in gas or liquid form depending on their temperature and pressure. The mixing of NGLs with dry natural gas makes it "wet."

Dry gas is typically used in heating and cooling systems and for electrical power generation. Once compressed, dry gas can be used as vehicle fuel. Wet gas is typically processed to separate out the NGLs which have a higher energy content and other uses than those of methane. Also, NGLs are usually more expensive than methane. For example, butane can be used in refrigeration and freezing systems, in torches for cooking, and as fuel for lighters and grills.

Customers demand gas based on, among other things, market prices, and gas quality, composition, and energy content. Gas suppliers attempt to meet those demands from different gas supplies.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
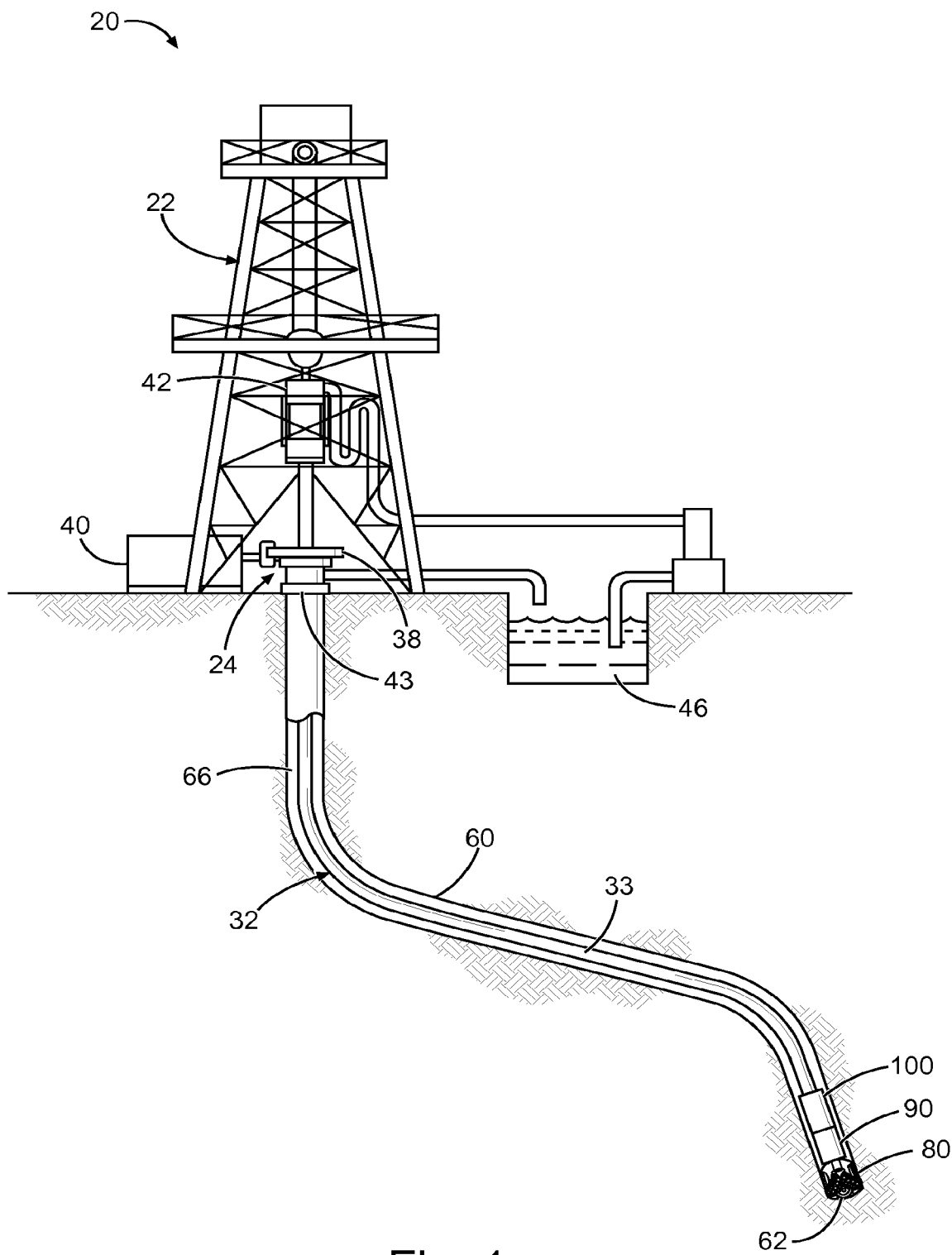
FIG. 1 is a schematic view, partly in cross-section, of an on-shore drilling apparatus.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict, for example, a horizontal, planar network having inputs on one side and outputs on another side, unless otherwise indicated otherwise, it should be understood by those skilled in the art that the apparatus according to the present disclosure is equally well suited for use in networks having other orientations and other points for inputs and outputs. Likewise, unless otherwise noted, even though a Figure may depict an onshore operation, it should be understood by those skilled in the art that the apparatus according to the present disclosure is equally well suited for offshore operation.

Generally, in one or more embodiments, a system is provided that automatically optimizes the gas content values, such as quality, composition, and energy content, of gas being transferred from multiple gas sources, such as gas wells, through pipelines and on to one or more points of output or export. To be sure, gas composition controls the composition, quality, and energy content so sometimes we may refer only to gas composition while not intending to exclude gas quality and energy content.

Different gas sources or gas source input points will have different and changing gas compositions. Further, customers will have different and changing demands for gas based on, for example, their own valuation and the market price of the various components of the gas. The price will fluctuate due to, e.g., global market conditions and regional customer demands. These changes in gas composition, customer valuations, and market prices provide operating companies with revenue maximization opportunities by dynamically and predictively managing the treatment and sale of gas from the different source input points. Also, embodiments of the system are able to but are not required to rapidly and gracefully rebalance gas distribution through the network within constraints despite events such as sudden loss of gas sources, import points, or export points.

FIG. 1 is an elevation view in partial cross-section of an on-shore drilling system 20 to produce one type of a gas source for a dynamic gas optimization system. The drilling system 20 recovers oil and gas from a wellbore 60 extending through various earth strata in an oil and gas formation located below the earth's surface. Drilling system 20 may include a drilling rig 22, such as the land drilling rig shown in FIG. 1. However, drilling system 20 may be deployed on offshore platforms, semi-submersibles, drill ships, and the like.

Drilling rig 22 may be located proximate to or spaced apart from wellhead 24, such as in the case of an offshore arrangement. Drilling rig 22 may include rotary table 38, rotary drive motor 40, and other equipment associated with rotation and translation of drill string 32 within wellbore 60. Annulus 66 is formed between the exterior of drill string 32 and the inside wall of wellbore 60. For some applications, drilling rig 22 may also include a top drive unit 42. Pressure control devices 43, such as blowout preventers and other equipment associated with drilling a wellbore may also be provided at wellhead 24.

The lower end of drill string 32 may include bottom hole assembly 90, which may carry at a distal end a rotary drill bit 80. Drilling fluid 46 may be pumped to the upper end of drill string 32 and flow through the longitudinal interior 33 of drill string 32, through bottom hole assembly 90, and exit from nozzles formed in rotary drill bit 80. At bottom end 62 of wellbore 60, drilling fluid 46 may mix with formation cuttings and other downhole fluids and debris. The drilling fluid mixture may then flow upwardly through annulus 66 to return formation cuttings and other downhole debris to the surface.

Bottom hole assembly 90 may include a downhole mud motor. Bottom hole assembly 90 and/or drill string 32 may also include various other tools that provide information about wellbore 13, such as logging or measurement data from the bottom 62 of wellbore 60. Measurement data and other information may be communicated using measurement while drilling techniques using electrical signals or other telemetry that can be converted to electrical signals at the well surface to, among other things, monitor the performance of drilling string 32, bottom hole assembly 90, and associated rotary drill bit 80.

In particular, devices, including MWD, LWD instruments, detectors, circuits, or other tools may be provided within a sub 100, according to one or more embodiments described in greater detail below. Sub 100 may be located as part of bottom hole assembly 90 or elsewhere along drill string 32. Moreover, multiple subs 100 may be provided. Although described in conjunction with drilling system 20, sub 100 may be used in any appropriate system and carried along any type of string. Sub 100 may be used to house an instrument, tool, detector, circuitry, or any other suitable device.

In some embodiments, and with continuing reference to FIG. 1, sub 100 includes measuring instrument(s) (not shown) for measuring local gas values such as gas quality, composition, energy content, and the like in real time. Optionally, sub 100 may communicate the local gas values to or as part of the dynamic gas optimization system disclosed herein.

After an oil/gas reservoir is reached, drill string 32 including rotary drill bit 80 is retracted and a completion string (not shown) is inserted to activate oil/gas flow into the wellbore and up to wellhead 24. Optionally, the completion string may also measure and transmit local gas values including, for example, flow rate to or as part of the dynamic gas optimization system disclosed herein.

Typically, drilling rig 22 is only on location during construction or drilling of the well. Once the well is finished, the rig is disassembled and moved to its next job site. All that remains is wellhead 24. However, for simplicity, pictures of drilling systems including drilling rigs and wellbores are shown as gas sources in figures of the dynamic gas optimization system.

Figure 2:
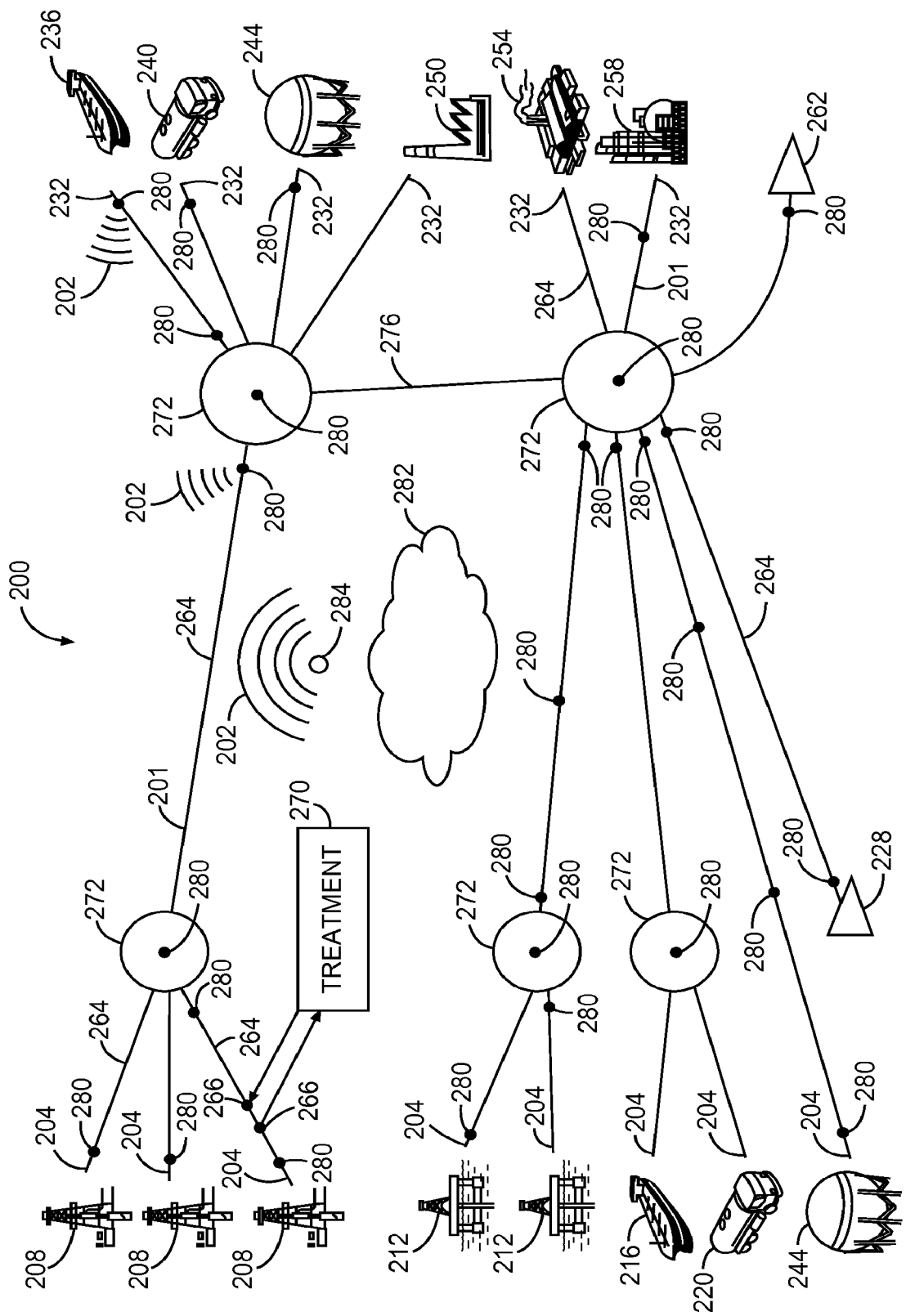
FIG. 2 illustrates a dynamic gas optimization system including different gas sources, different gas customers or users, a gas pipeline network therebetween, and a communication and control network including smart meters.

Referring to FIG. 2, a system for dynamic gas composition optimization 200 is shown. System 200 includes a gas pipeline network 201 and a communication and control network 202. Communication and control network 202 includes all communication and control elements in FIG. 2. However, for the sake of clarity, only a few representative examples of communication and control elements are labeled with reference number 202.

Gas is input to the system at gas import points 204 from gas sources including on-shore gas wellheads 208, off-shore gas wellheads 212, a tanker capable of traveling by sea 216, a gas truck 220, an on-ground storage tank 224, an import terminal 228, and any other source of gas. At the opposite end of system 200 are gas export points 232 including for example a tanker capable of traveling by sea 236, a gas truck 240, an on-ground storage tank 244, a gas-fired power generator 250, a manufacturing plant having gas furnaces 254, a petrochemical plant 258, an export terminal 262, gas brokers (not shown), and liquefaction plants (not shown). Of course it will be appreciated by those or ordinary skill in the art that the input and output points may be anywhere within the system 200.

Between import points 204 and export points 232, the gas flows through flow lines, pipes, or pipelines 264. Typically, flow is maintained using pumps to lift reservoir fluids up through the wellbores and compressors to move separated gas along the pipelines. Pumps and compressors may operate at very high speeds (thousands of RPM) and, under the best of conditions, they have relatively predictable service lives (or "mean time to failure"). Bearings in the pumps and compressors are typically prone to failure. Bearings are used to align the pump or compressor or pump drive shaft in the correct position, and are lubricated to prevent friction from wearing away the shaft metal, which can lead to seal failure and fluid leakage. If there is a loss of lubrication oil, or if the oil becomes dirty or degrades chemically due to high temperatures, then the bearing surfaces will contact and grind against each other. Poor lubrication can also lead to misalignment of the drive shaft, causing the compressor or pump to vibrate, which may also shorten its useful life. Failure of the pump or compressor can lead to an unanticipated shutdown of a pipeline, stopping the flow of gas from a wellhead or otherwise stopping the flow of gas within the pipeline network. Unanticipated shutdowns due to equipment problems are a chronic source of production loss in gas wells and surface processing facilities.

Some or all pipelines 264 include diverter valves 266 to divert gas to treatment point 270. Treatment point 270 is a treatment facility that selectively removes impurities such as nitrogen and sulfur compounds, and/or selectively removes certain hydrocarbons depending on the desired gas composition at export points 232. After treatment, the gas is returned to the pipeline 264 from which it came or, alternatively, to any other point in the gas pipeline network 201.

Also in between the input points 204 and the output points 234 are junctions 272. In the context of a material supply network, such as the gas pipeline network 201, a junction is a point having any of a) two or more inputs and an output, b) an input and two or more outputs, or c) two or more inputs and two or more outputs. In the nodes, the gas is combined or divided. The junctions 272 include remotely-controllable flow control devices including valves to increase or decrease gas flow into and out of the junctions through the pipelines connected thereto. In other embodiments, junctions 272 include proportional valves or valve systems that route different proportions of gas from selected inputs to selected outputs. For example, a junction having two input streams A and B and two output streams C and D can have its valve system settings adjusted so that output stream B comprises ¼ of stream A and ¾ of stream B while stream C comprises ¾ of stream A and ¼ of stream B. In other embodiments, junctions 272 include time division multiplexing valve systems that selectively close inputs and/or outputs to achieve a desired gas composition in one or more output streams. In still other embodiments, other flow control devices, such as compressors, may be used with or in place of valves.

More generally, system 200 represents a system for balancing or optimizing the supply and demand of gas. System 200 optimizes the flow of gas from all points within the system by controlling the valves in the pipelines to create gas streams having pre-computed, instantaneous, target values. More specifically, smart meters 280 determine the local gas values at different points or nodes in the gas pipeline network and automatically suggest contributions or local gas request parameters from participating gas streams to meet the target values.

Customers represented by export points 232 will have different customer request parameters for their gas including, for example, one or more of (i) a price, (ii) composition, (iii) energy content such a gross heating value, (iv) quality which can include the amount of impurities or contaminants, or interchangeability with other gases, (v) dew point, (vi) flow rate, (vii) total volume, and (viii) delivery timing. For example, customers may request one or more of (i) a certain price range, (ii) a methane composition of, for example, 85% or higher, (iii) a propane composition of, for example, 30% or higher, (iii) a gross heating value of, for example, 2000 Btu/ft3 or higher, (iv) a quality range specified by a Wobbe Index (measured in Kcal/Nm3 or MEN m3) between an upper index and a lower index, (v) a dew point, (vi) a maximum impurity concentration of, for example, hydrogen sulfide of less than a certain amount. By way of example, we will discuss how request parameters of price and a propane composition of 30% or higher can be optimally met by the dynamic gas optimization system disclosed herein. Assume system 200 has two import points providing a gas stream having a propane composition of 35% and another gas stream having a propane composition of 20%. In a market where propane may be fetch a relatively high price, the system would calculate a target parameter of 30% propane. Instead of supplying the gas stream having 35% propane, the system could optimize the sale of the gas by supplying a gas mixture of two parts of the gas stream of 35% propane and one part of the gas stream of 20% propane so that customer receives gas of exactly 30% propane. In this way, the supplier would not waste the value of the extra propane in the gas stream of 35% propane. Of course, optimization becomes much more difficult with more input points and output points, changing gas compositions, changing request parameters, and changing market prices.

With continuing reference to FIG. 2, communication and control network 202 includes self-discoverable, peer-to-peer smart meters 280 placed at import points 204, export points 232, treatment point 270, junctions 272, and at spaced points along pipelines 264. The smart meters 280 can perform at least four functions: generate local gas values, communicate local and system gas values, calculate target values, calculate local request parameters, and control valves or valve systems. Generating local gas values includes determining real-time properties or characteristics of the gas, such as gas pressure, volume, and temperature ("PVT") values or formulations, gas composition, gas energy content, and fluid phases. The smart meter uses embedded software to continuously recalculate and broadcast the local gas values of fluid flowing by it in real time.

Communicating gas values includes transmitting the local gas values to other smart meters 280, receiving and retransmitting local gas values from other smart meters, and receiving and retransmitting system gas data from other smart meters or a broadcast point. The smart meters 280 communicate with each other by wire or wireless. Preferably, the smart meters communicate wirelessly for ease of installation. The smart meters communicate with each other directly or indirectly, such as via a public network such as the Internet 282 or via a private network. The public or private network is also part of communication and control network 202.

Calculating target values includes calculating local target values, for example, desired PVT parameters for the gas flowing through the pipeline portion at which the meter is located, and system target values, for example, local target gas values for all nodes or smart meters to allow the system to meet customer request parameters at the lowest cost for the supplier.

Communication and control network 202 also includes broadcast server 284 which broadcasts data to one or more meters 280. The meters retransmit the broadcast data to other meters in order to reach all meters 280 in system 200. The broadcast data includes customer request parameters, market data, event data, software updates, and the like. Customer request parameters include gas quality, composition, volume, flow rate, price, and timing information. Event data includes events such as anticipated shutdowns of gas sources, pipelines, or export points due to, for example, decreasing well yield, scheduled maintenance, or closed supply contracts. Event data also includes events such as unanticipated shutdowns of gas sources, pipelines or export points due to, for example, blowouts, delay in arrival of a shuttle tanker, or mechanical failure of pumps or compressors.

Market data includes streaming global and local price data, local actual or estimated storage volumes (e.g., estimated gas volumes accessible by a drilling platform 208, and actual gas volumes in on-ground storage tank 224) and/or cost-of-production data for various gas components. Software updates includes new calibration software, gas optimization software, and the like. Optionally, broadcast server 284 broadcasts target values or override data to, for example, close all valves in part of the pipeline network in the event of an accident.

With continuing reference to FIG. 2, to further explain the operation of the dynamic gas optimization system 200, we initially assume all gas sources at import points 204 are supplying steady streams of gas to pipeline network 201, all gas valves in pipeline network 201 are fully open except the valve in the internodal pipeline 276 which is closed. In this case, we have two separate pipeline networks, an upper one, which is supplied by on-shore drilling platforms 208, and a lower one, which is supplied by off-shore drilling platforms 212 and other gas sources. Further, in such case the gas supplied to the export terminals of the upper pipeline network will be essentially a consistent mixture of the gas streams from the sources because of the mixing that occurs at junctions 272. In a second case, if gas from one of the on-shore drilling platforms 208 suddenly becomes "sour", that is, contains an unwanted impurity, system 200 can detect this, close off the pipeline supplying the sour gas, and signal for increased output from the other two gas sources to make up the loss of gas. In a third case, if a customer represented by on-ground storage tank 244 requests more wet gas than other customers connected to the upper pipeline network, system 200 can signal for increased production of wet gas from any source supplying a higher concentration of wet gas and effectively route that gas to the customer without falling outside of the request parameters of the other customers.

Figure 3:
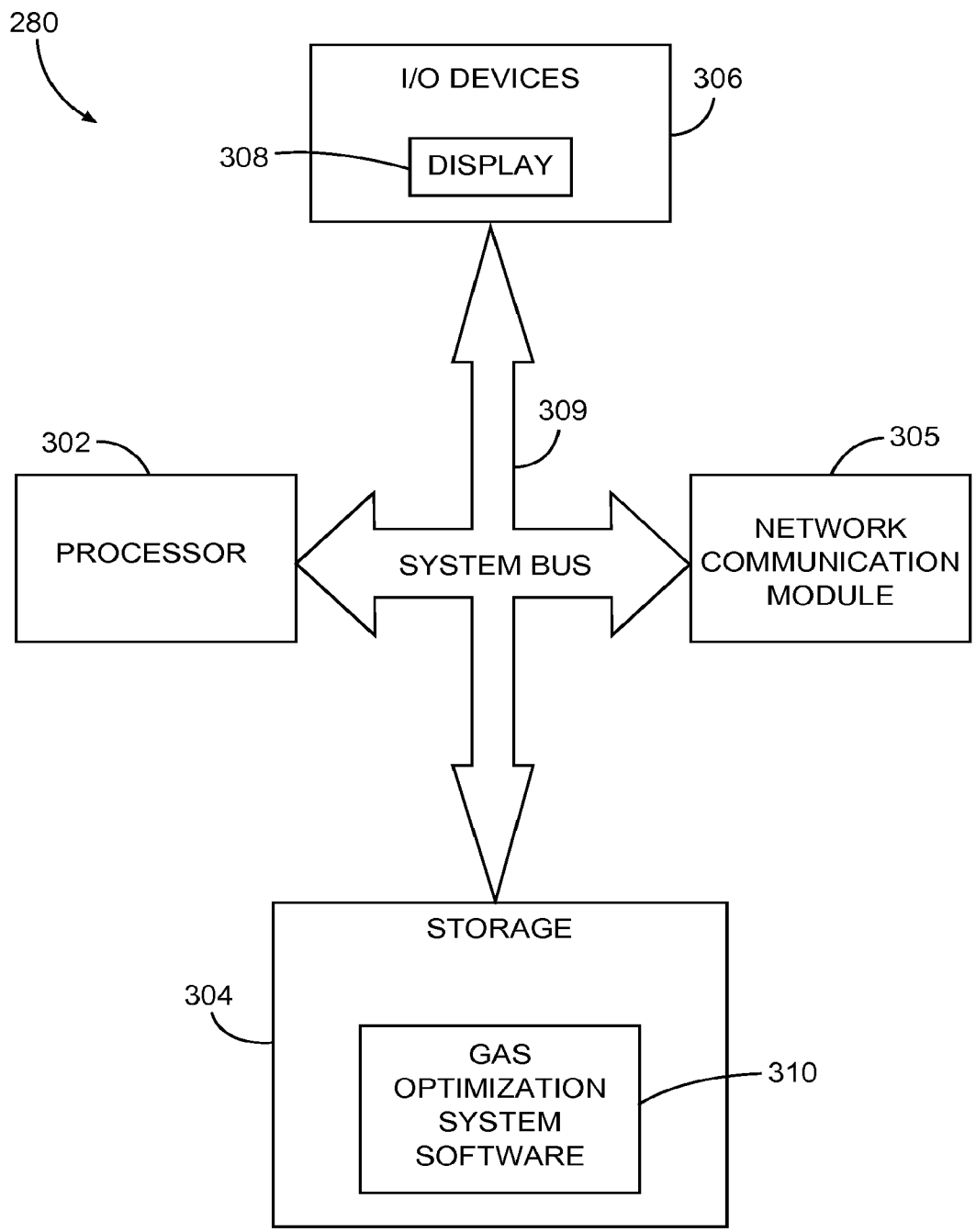
FIG. 3 is s simplified schematic view of smart meter used in a dynamic gas optimization system

FIG. 3 is a block diagram of an exemplary smart meter 280 adapted to implement the dynamic gas composition optimization system as described herein. Meter 280 includes at least one processor 302 and a computer-readable storage 304. The computer-readable storage 304 contains a system memory, such as random access memory (RAM), and non-transitory memory such as an optical or magnetic storage device and a read-only memory (ROM). The meter 280 also includes a network communication module 305, optional I/O devices 306, and an optional display 308 as one of the I/O devices, all interconnected via a system bus 309. System bus 309 represents all system, peripheral, and chipset buses that communicatively connect the number internal devices of meter 280 including processor 302, storage 304, I/O devices 306 and network communication module 305. The network communication module 305 is operable to communicatively couple the meter 280 to other meters or computers over a communication and control network. In one embodiment, the network communication module 305 is a network interface card (NIC) and communicates using a wireless-fidelity (WiFi) protocol. In other embodiments, the network communication module 305 may be another type of communication interface for use with a cellular phone network, Ethernet, or fiber optic cable, and may communicate using a number of different communication protocols. Meter 280 may be connected to one or more public (e.g. the Internet 282) and/or private networks (not shown) via the network communication module 305. Such networks may include, for example, servers containing customer request parameters or optimization algorithms.

Software instructions 310 executable by the processor 302 for implementing the dynamic gas optimization system 200 in accordance with the embodiments described herein, may be stored in storage 304. The software may include software to, among other things, run compositional pressure/volume/temperature ("PVT") correlations for the gas passing through the pipeline at the point at which the meter is placed. It will be recognized that the dynamic gas optimization system software 310 may be loaded into storage 304 through the network communication module 305, or from a FLASH memory drive, optical disc drive or other appropriate storage media. Processor 302 loads gas optimization system software 310 and gas data to execute processes in the subject disclosure. Processor 302 can be a single processor or a multi-core processor in different embodiments. ROM in storage 304 stores static data and instructions that are needed by processor 302 as well as other modules of meter 280. System memory of storage 304 stores some of the instructions and data that the processor needs at runtime. In some implementations, the processes of the subject disclosure are stored in system memory and non-transitory memory of storage device 304.

Bus 309 also connects to input and output (I/O) devices 308 which can include interfaces. Input devices enable a user to communicate information and select commands to the system 200. Input devices used with input device interface 814 include, for example, alphanumeric, QWERTY, or T9 keyboards, microphones, and pointing devices. Output devices enable, for example, the display of images generated by meter 280. Output devices include, for example, printers and display devices, such as liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described devices or interfaces.

In certain embodiments, meter 280 may be an integrated unit while in other embodiments it may contain only a processor, ASICs, and associated computer hardware and software, while other components, such as storage 304 and I/O devices or interfaces 306 may be external thereto.

Figure 4:
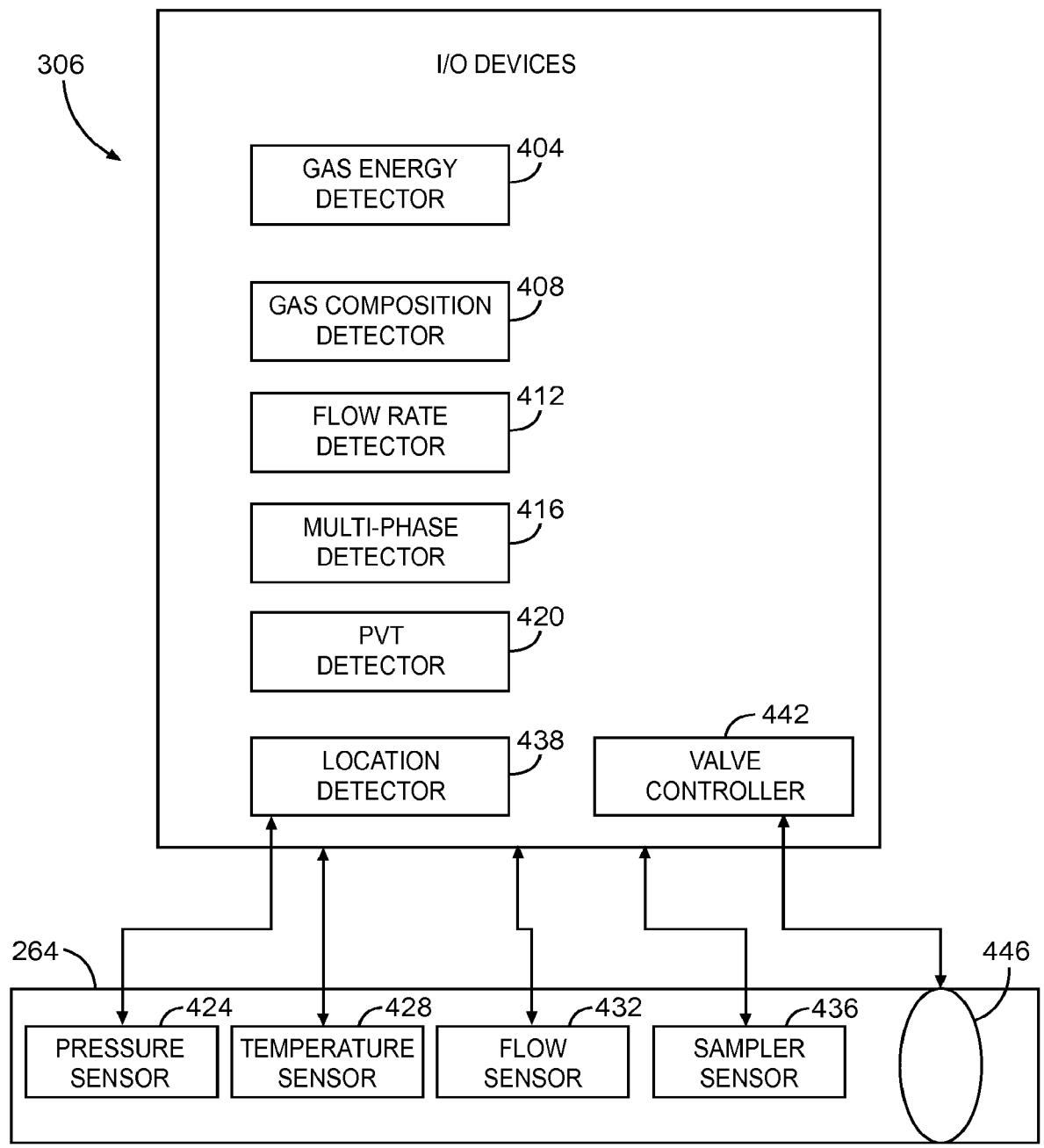
FIG. 4 is schematic view of the input/output devices of a smart meter that obtains local gas data from a pipeline in a gas pipeline network, and controls the flow of gas in the pipeline

With reference to FIG. 4, to generate local gas values, the I/O devices 306 of meter 280 include any or all of devices of or interfaces to a gas energy detector 404, a gas composition detector 408, a flow rate detector 412, a multi-phase detector 416, and a PVT detector 420. Gas energy detector 404 uses apparatuses and methods determinable by those of ordinary skill in the art such as acoustic or ultrasonic resonators and reference gases. Gas composition detector 408 uses apparatuses and methods determinable by those of ordinary skill in the art such as gas chromatography or infrared absorption spectroscopy. Flow rate detector 412 uses apparatuses and methods determinable by those of ordinary skill in the art such a venturi meters and differential pressure meters. Multi-phase detector 416 uses apparatuses and methods determinable by those of ordinary skill in the art such as producing a homogeneous sample of a a pressurized fluid stream flowing in a pipeline, injecting a surface active agent into the fluid stream, and sampling and analyzing a portion of the resulting fluid stream.

These detectors include application specific integrated circuits (ASICs) and associated electronics which receive and process sensor data or outputs from various sensors in and/or on associated pipe or pipeline 264 including a pressure sensor 424, temperature sensor 428, flow sensor 432 and sampler sensor 434. Based on this and optionally other sensor data, the detectors calculate local gas values. The sensors and detectors may be calibrated using, e.g., fluid samples analyzed a remote laboratory or using an artificial intelligence algorithm such as an embedded neural network program. It will be understood by those skilled in the art that gas values may be estimated or calculated from sensor data by processor 302, ASICs, field programmable gate arrays (FPGAs), or other processing devices.

I/O devices 306 also includes location detector 438. The detector includes an antenna or radiofrequency receiver for receiving location signals. Based on the signals, the detector determines its location relative to the earth or to the gas pipeline network 201. For example, the location detector may be a global positioning system ("GPS") detector capable of receiving GPS satellite signals and determining its location based thereon.

I/O devices 306 also includes a valve controller 442 which controls the opening and closing of valve 446, such as a high-sensitivity proportional gas metering valve, in pipeline 264 based on valve settings calculated from local request parameters, local target values, or other outputs of the dynamic gas optimization system 200. For instance, if the pipeline contains dry gas and local request parameters demand wet gas, the valve could be partially or fully closed to decrease the input of dry gas to the system. More generally, with reference to FIG. 2, some or all of the smart meters 280 are connected to valves to control the flow of gas at some or all points in the pipeline system 201 such as import points, export point, treatment points, or junctions.

Figure 5:
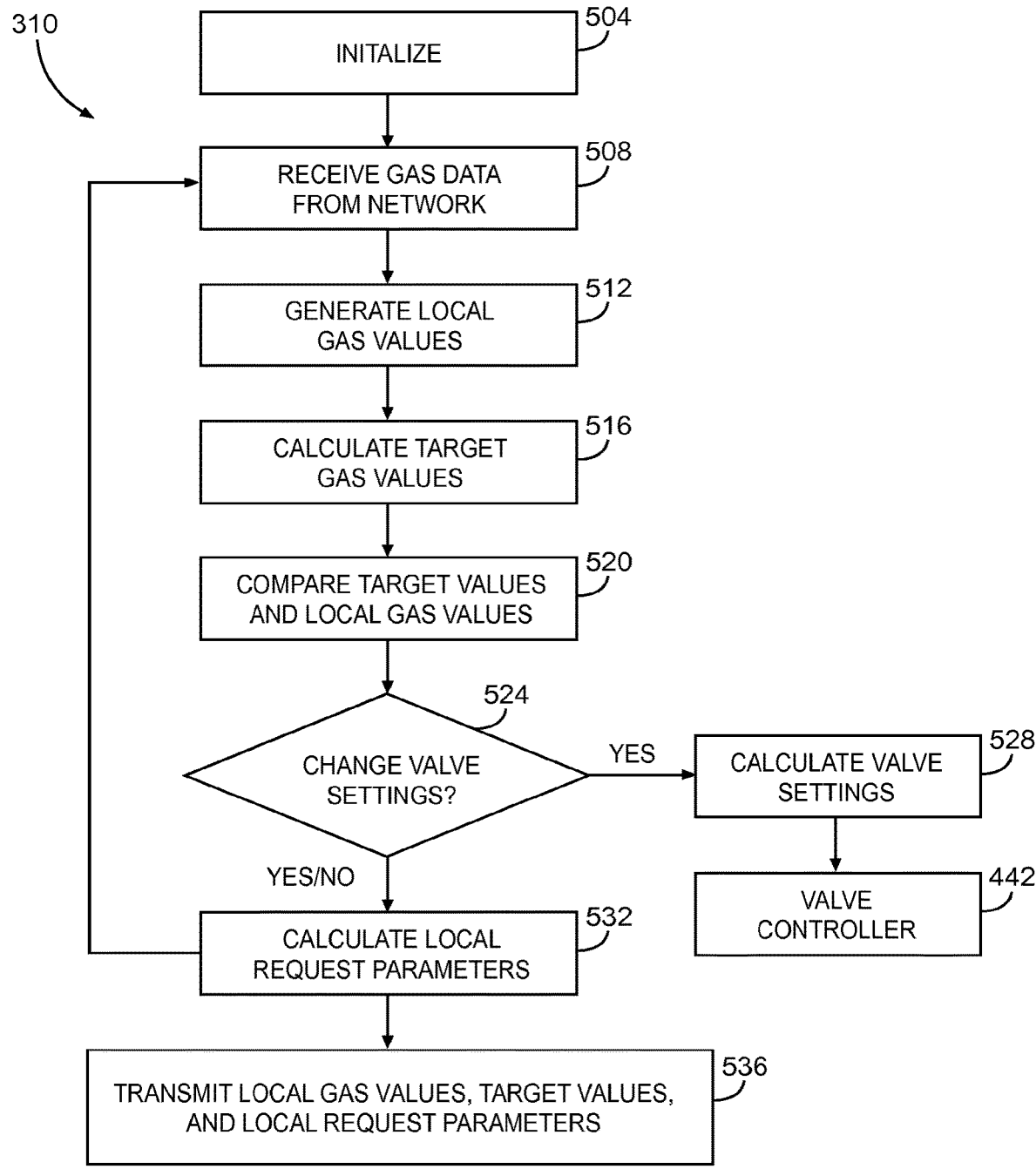
FIG. 5 is a flow chart of an exemplary process performed by a smart meter in a dynamic gas optimization system.

FIG. 5 is an exemplary flow chart of the steps performed by the gas optimization software 310 installed and executable on smart meters 280 for implementing the dynamic gas optimization system 200. The software may be one executable application or multiple executable applications. In step 504, the software causes the smart meter to initialize which includes one or more of determining its location in system 200, communicatively connecting to other smart meters, receiving and installing any new or updated gas optimization software 310, and calibrating I/O devices and detectors.

In step 508, smart meter 280 receives system gas data from the network, i.e., from another smart meter 280 or broadcast server 284. The system gas data includes customer request parameters, system and local target values, global and local market prices, local gas values from one or more meters 280, location of the smart meters 280 within the gas pipeline network, local gas request parameters, and the like. In step 512, local gas values are generated based on the outputs from I/O devices 306 of the smart meter. In step 516, target gas values are calculated based on the system gas data which includes the local gas values generated at step 512 and local gas request parameters generated by other meters. These values represent an optimal balancing of gas supply and gas demand in the pipeline network while minimizing costs to the gas supplier. The calculation of the target values can be extensions of the two-stream calculation shown above or other types of calculations known to those skilled in the art.

In steps 520 and 524, target values are compared to the local gas values to determine whether gas flowing through the pipeline associated with the meter 280 should be changed, e.g., whether the local valve settings should be changed to increase or decrease gas flow. If they should be changed, then at step 528, valve settings are calculated based on the results of the comparison of the target values and local gas values at step 520. The valve settings are communicated to valve controller 442 which then opens or closes valve 446. In step 532, local request parameters are calculated based on the results of the comparison of the target values and local gas values at step 520. In step 526, the local gas values, target values and local gas request parameters are transmitted to other meters via the communication and control network 202. Steps 508 to 536 are repeated at a frequency dependent on hardware limitations such as the power supply for the meter 280, energy efficiency of the communication, processing, and storage components in the meter 280, and volatility or rate of meaningful changes of the local gas values and system gas data. In one embodiment considering current technology and some historical gas data, the steps are repeated at a frequency of once every five minutes. However, it will be appreciated that this frequency may be increased or decreased. It will also be appreciated that the steps may be performed in a different order, and steps may be revised, added, replaced, or deleted. For instance, as an example of a revised step, in some embodiments, it may not be necessary to transmit local gas values or target values per step 536.

In other embodiments, gas optimization software 310 includes a step to determine whether override data has been received by smart meter 280 and if so, directing the valve controller 442 according to the data. In this way, the gas pipeline network may be quickly shut down in the event of an accident such as a pipeline rupture or fire. In other embodiments, smart meter 280 and gas optimization software 310 may perform steps to determine whether gas in a pipeline should be diverted to a gas to a treatment facility 270 and then diverting the gas by controlling a diverter valve.

In other embodiments, gas optimization software 310 includes a step to compare local gas values from two different meters on a single pipeline in order to determine whether the pipeline may have a leak, whether contaminants have entered the pipeline, and/or whether a meter may be functioning improperly. For example, a meter could have a faulty or improperly calibrated detector causing its generated local gas values to differ from the local gas values of a downstream meter. If the local gas values from the two different meters show a meaningful difference, then an alert can be sent to an operator to investigate the area between and surrounding the two meters to identify and rectify the problem. In other embodiments, gas optimization software 310 includes a step to determine whether a gas stream is the result of an unwanted commingling of gas streams. This can occur, for example, at the output of a junction.

In some embodiments of the dynamic gas optimization system, the communication network is linked to down-hole detectors to communicate gas values to the system 200 in advance of supply of gas to the system. In this way, the system may determine that gas input sources should be shut down, started up, or accelerated.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of method 700 of FIG. 7, as described above, may be implemented using system 800 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

Thus, a system for controlling gas flows in a pipeline network has been described. Embodiments of a system for controlling gas flows in a pipeline network may generally include a pipeline network having a plurality of gas import points, a plurality of gas export points, and pipelines connected therebetween. The pipelines are interconnected by at least one junction. Each of the gas import points, gas export points and junction have a sensor and a flow control device, both of which correspond to a unique one of a plurality of smart meters. Each of the plurality of smart meters includes a communication network interface and a flow control device controller. Embodiments of a system for controlling gas flows in a pipeline network may also include a plurality of gas sources at gas import points and a plurality of gas customers associated with the gas export points. The gas customers provide customer gas request parameters. Embodiments of a system for controlling gas flows in a pipeline network may also include a communication and control network including the plurality of peer-to-peer smart meters. Each smart meter is capable of repeatedly: (1) receiving system gas data via the communication network interface, the system gas data including the customer gas request parameters and first local gas request parameters from at least one other smart meter, (2) controlling the flow control device based on the first local gas request parameters via the flow control device controller, (3) generating local gas values based on an output from the corresponding sensor, the local gas values including one or more of gas PVT correlations, gas quality values, gas energy content values, gas composition values, gas phase values, gas flow rate values, and gas dew point values, (4) calculating second local gas request parameters based on the local gas values and the system gas data; and (5) transmitting the system gas data including the second local gas request parameters.

For any one of the foregoing embodiments, the system may include any one of the following elements, alone or in combination with each other: each smart meter is capable of repeatedly performing the aforementioned steps at least once every five minutes; the flow control device is one of a valve, a valve system, and a compressor; a valve system that proportionally diverts input streams to selected output streams in the manner of spatial or time division multiplexing; system gas data includes real-time gas market prices; each smart meter is capable of repeatedly, based on system gas data, calculating a lowest total gas cost and system gas target values that meet the customer gas request parameters, the system gas target values including local gas target values of gas corresponding to the sensors of the smart meters; each of the plurality of smart meters includes a storage for storing gas optimization software capable of, on execution, causing the smart meter to perform steps (1) to (5); a broadcast point separate from a smart meter, the broadcast point capable of broadcasting broadcast data including the customer request parameters, gas market prices, and an update to the gas optimization software; and the smart meter further includes a location detector capable of generating a location of the smart meter for including in the system gas data.

A method for controlling gas flows from gas import points to gas export points in a pipeline network has been described. Embodiments of the method may include: transmitting and retransmitting system gas data for the pipeline network through a communication and control network including a plurality of smart meters connected to the pipeline network, the system gas data including customer gas request parameters for gas at the export points; sensing properties of gas flowing through the pipeline network at a first smart meter of the plurality of smart meters and generating first local gas values therefrom; generating first local gas request parameters based on the system gas data and the first local gas values; transmitting the first local gas request parameters from the first smart meter to a second smart meter of the plurality of smart meters; receiving the first local gas request parameters at the second smart meter; controlling gas flow through the pipeline network at the location of the second smart meter based on the first local gas request parameters; sensing properties of gas flowing through the pipeline network at the second smart meter and generating second local gas values therefrom; generating second local gas request parameters based on the system gas data and the second local gas values; and, transmitting the second local gas request parameters to a third smart meter of the plurality of smart meters.

For the foregoing embodiments, the method may include any one of the following steps, alone or in combination with each other: the system gas data includes real-time gas market prices; based on system gas data, calculating a lowest total gas cost and system gas target values that meet the customer gas request parameters, the system gas target values including local gas target values of gas at the smart meters; transmitting software from the first meter to the second meter; storing the software on the second meter; executing the software on the second meter; and broadcasting broadcast data from a broadcast point separate from a smart meter to the first smart meter, the broadcast data including the customer request parameters, gas market prices, and an update to the software.

A smart meter for controlling gas flows in a pipeline network having a plurality of gas import points, a plurality of gas export points, and pipelines connected therebetween, the pipelines interconnected by at least one junction, each of the gas import points, gas export points and junction having a gas property sensor and a flow control device has been described. Embodiments of the smart meter may generally include: an input interface for operatively coupling with a gas property sensor in a pipeline network and receiving sensor data; a network communication module for receiving system gas data including first local gas request parameters and for transmitting second local gas request parameters; a first calculator for calculating flow rate controller device settings based on the sensor data, the system gas data, and the first local gas request parameters; a flow rate controller device controller for operatively coupling with a flow rate controller device and for controlling it based on the flow rate controller device settings; and a second calculator for calculating the second local gas request parameters based on the system gas data and the sensor data.

For any of the foregoing embodiments, the smart meter may include any one of the following elements, alone or in combination with each other: a processor and a storage for storing gas optimization software, the processor for executing the gas optimization software, the processor including the first calculator and the second calculator; the network module is also for receiving broadcast data from a broadcast point separate from another smart meter, the broadcast data including the customer request parameters, gas market prices, and an update to the gas optimization software; the flow control device is one of a valve, a valve system, and a compressor; system gas data includes real-time gas market prices; a third calculator for calculating, based on the system gas data, a lowest total gas cost and system gas target values that meet the customer gas request parameters; and a location detector capable of generating a location of the smart meter for including in the system gas data.

The embodiments set forth herein are merely illustrative and do not limit the scope of the disclosure or the details therein. It will be appreciated that many other modifications and improvements to the disclosure herein may be made without departing from the scope of the disclosure or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A system for controlling gas flows in a pipeline network comprising:
   a pipeline network having a plurality of gas import points, a plurality of gas export points, and pipelines connected therebetween, the pipelines interconnected by at least one junction, each of the gas import points, gas export points and junction having a sensor and a flow control device, both of which correspond to a unique one of a plurality of smart meters, each of the plurality of smart meters including a communication network interface and a flow control device controller;
   a plurality of gas sources at gas import points, and
   a communication and control network including the plurality of peer-to-peer smart meters, each smart meter including a processor and a memory having processor-executable instructions stored therein, which, when executed by the processor, cause the smart meter to perform a plurality of operations, including operations for:
   (1) receiving system gas data via the communication network interface, the system gas data including customer gas request parameters and first local gas request parameters from at least one other smart meter, the customer gas request parameters including gas quality, gas composition, gas volume, gas flow rate, gas price, and gas delivery timing information,
   (2) controlling a corresponding flow control device based on the first local gas request parameters via the flow control device controller,
   (3) generating local gas values based on an output from a corresponding sensor, the local gas values including one or more of gas PVT correlations, gas quality values, gas energy content values, gas composition values, gas phase values, gas flow rate values, and gas dew point values,
   (4) calculating second local gas request parameters based on the local gas values and the system gas data, the second local gas request parameters including system gas target values that meet the customer gas request parameters at a lowest total gas cost; and
   (5) transmitting the system gas data including the second local gas request parameters to other smart meters in the pipeline network.

2. The system of claim 1 wherein repeatedly includes at least once every five minutes.

3. The system of claim 1 wherein the flow control device is one of a valve, a valve system, and a compressor.

4. The system of claim 1 wherein system gas data includes real-time gas market prices.

5. The system of claim 1, wherein the system gas target values include local gas target values of gas corresponding to the sensors of the respective smart meters.

6. The system of claim 1 wherein each of the plurality of smart meters includes a storage for storing gas optimization software capable of, on execution, causing the smart meter to perform steps (1) to (5).

7. The system of claim 1 further including a broadcast point separate from a smart meter, the broadcast point capable of broadcasting broadcast data including the customer request parameters, gas market prices, and an update to the gas optimization software.

8. The system of claim 1 wherein the smart meter further includes a location detector capable of generating a location of the smart meter for including in the system gas data.

* * * * *